United States Patent [19]

Eisenberg

[11] 4,363,645
[45] Dec. 14, 1982

[54] ANNULAR BUSHING FOR FORMING GLASS FIBERS

[75] Inventor: Arnold J. Eisenberg, Granville, Ohio

[73] Assignee: Owens-Corning Fiberglas Corporation, Toledo, Ohio

[21] Appl. No.: 287,171

[22] Filed: Jul. 30, 1981

Related U.S. Application Data

[63] Continuation-in-part of Ser. No. 137,669, Apr. 4, 1980, abandoned.

[51] Int. Cl.³ .......................................... C03B 37/025
[52] U.S. Cl. .................................................. 65/2; 65/1; 65/12
[58] Field of Search ........................... 65/1, 2, 12, 10.1

[56] References Cited

U.S. PATENT DOCUMENTS

| 2,485,851 | 10/1949 | Stevens | 65/12 X |
| 2,699,415 | 1/1955 | Nachtman | 65/12 X |
| 4,088,468 | 5/1978 | Roberson | 65/2 X |

FOREIGN PATENT DOCUMENTS

| 76584 | 1/1976 | Australia | 65/12 |
| 51-7218 | 1/1976 | Japan | 65/1 |

Primary Examiner—Robert L. Lindsay, Jr.
Attorney, Agent, or Firm—Ronald C. Hudgens; Philip R. Cloutier

[57] ABSTRACT

Apparatus and method of producing glass fibers employing a tipped or tipless annular bushing plate from which fibers are drawn as an annular array. A cooling gas, such as air, is directed into contact with the bushing plate and with either, or both, the exterior and interior of the annular array.

12 Claims, 10 Drawing Figures

ANNULAR BUSHING FOR FORMING GLASS FIBERS

TECHNICAL FIELD

This is a continuation-in-part of my application Ser. No. 137,669 filed Apr. 4, 1980 now abandoned.

This invention relates to bushing plates employed for the production of glass fibers.

In one of its more specific aspects, this invention relates to apparatus and methods involving the use of annular bushing plates for the production of glass fibers.

BACKGROUND ART

The production of glass fibers is well known. In general, molten glass is introduced into a bushing having an apertured, or orificed, bottom plate. Molten glass is caused to flow as individual filaments through the apertures of the plate. The filaments are sized, gathered into a strand and the strand is wound as a package on a collet of a winder.

In order to increase the production rate from such bushings, various methods have been employed. One method involves impinging a cooling gas, such as air, on the orificed plate to eliminate stagnant gas pockets from the outer face of the bushing plate and to cool the molten glass cones formed at the orifices. This impingement aids in maintaining fiber separation and allows a significant increase in the number of orifices which can be positioned in the plate.

As this process has developed, a major problem has arisen in that gas cooling becomes less effective as the size of the orifice plates increases for the purpose of increasing production. As the number of filaments drawn from an orifice plate increases, the extent to which the cooling gas is enabled to effectively penetrate the mass of filaments decreases. This dictates that orifice plates with large numbers of apertures must be very long in relation to their width. This creates problems with fitting such bushings to existing forehearths, heating such bushings and maintaining a uniform heat pattern, feeding glass from the forehearth without channelling, and the like.

The method and apparatus of this invention is directed towards the solution of those problems and relates to bushings, having tips or tipless, from which fibers are drawn as an array of fibers; that is, the fibers are drawn from an annular area in which are positioned a plurality of orifices substantially completely surrounding an area positioned centrally of the plate in which no orifices are positioned.

DISCLOSURE OF THE INVENTION

According to this invention, there is provided a bushing comprising an annular orificed bushing plate, a center portion positioned within the annular plate and at least one port opening from the center portion to provide open communication from the center portion to the exterior of the bushing.

Also, in accordance with the invention there is provided at least one gas discharge manifold in combination with the bushing plate adapted to discharge gas into contact with the annular orificed bushing plate.

In one embodiment of this invention, the gas discharge manifold is adapted to discharge inwardly towards the center portion of the bushing.

In another embodiment of this invention, a gas discharge manifold is adapted to discharge outwardly from the center portion into contact with the bushing plate.

Also, according to this invention, there is provided a method of producing glass fibers which comprises drawing glass fibers as an annular array from an annular bushing plate and introducing a gas into contact with the periphery of the annular array of fibers and the bushing plate.

In one embodiment of the invention, the gas is introduced into contact with the inner periphery of the annular array.

In another embodiment, the gas is introduced into contact with the outer periphery of the annular array.

By "tipless" is meant that the plate, proper, contains no downwardly projecting apertured extensions, which extensions project beyond the generally planular lower surface of the plate.

BRIEF DESCRIPTION OF THE DRAWINGS

The invention will be more easily understood if explained in conjunction with the attached drawings in which.

BEST MODE OF CARRYING OUT THE INVENTION

Figure 1:
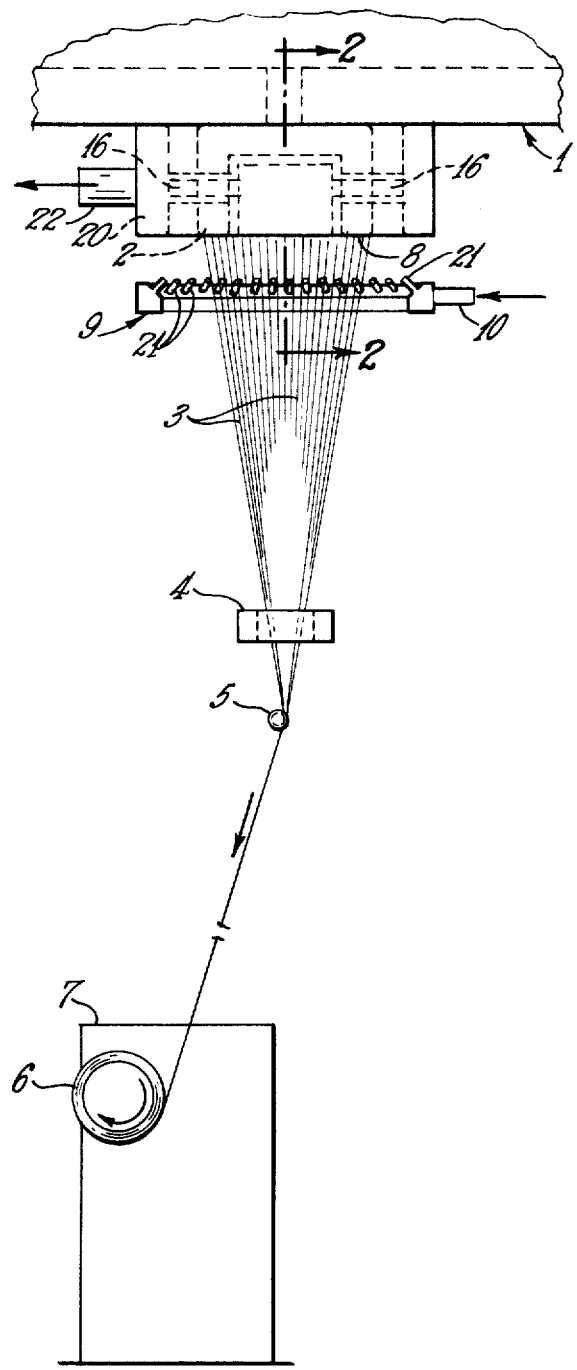
FIG. 1 is an elevational view of one embodiment of the apparatus of this invention.

Referring now to FIG. 1, there is shown forehearth 1 from which glass is discharged into bushing 2 from which filaments 3 are drawn through orificed, or apertured, bushing plate 8. The filaments are sized at size applicator 4, gathered at a gathering shoe 5 and collected as a package 6 on winder 7. Encircling the fan of fibers is manifold 9.

Figure 2:
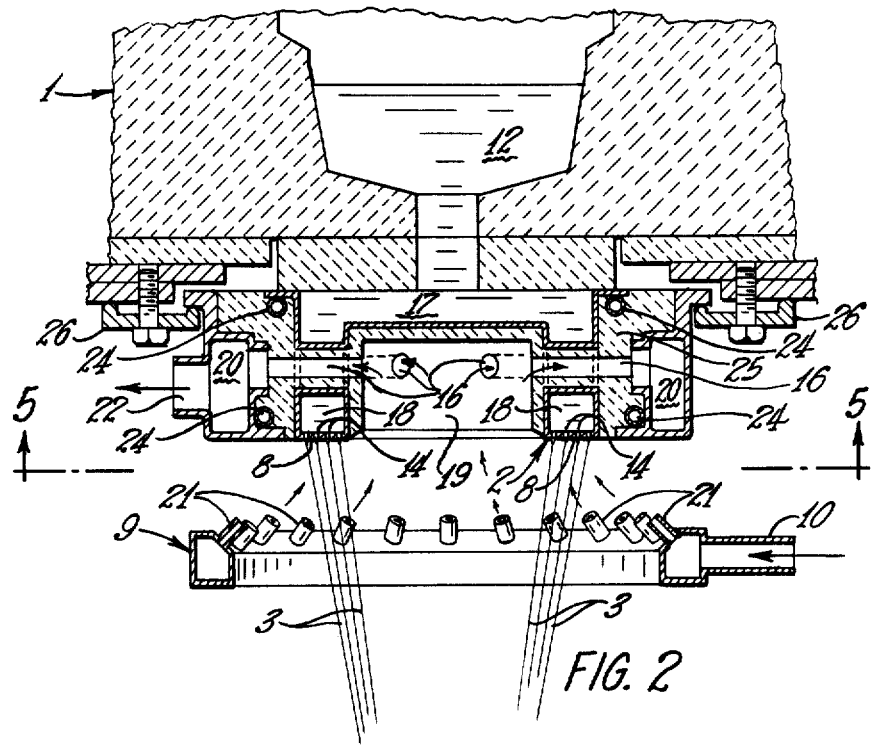
FIG. 2 is an elevational view taken through section 2—2 of FIG. 1.
Figure 5:
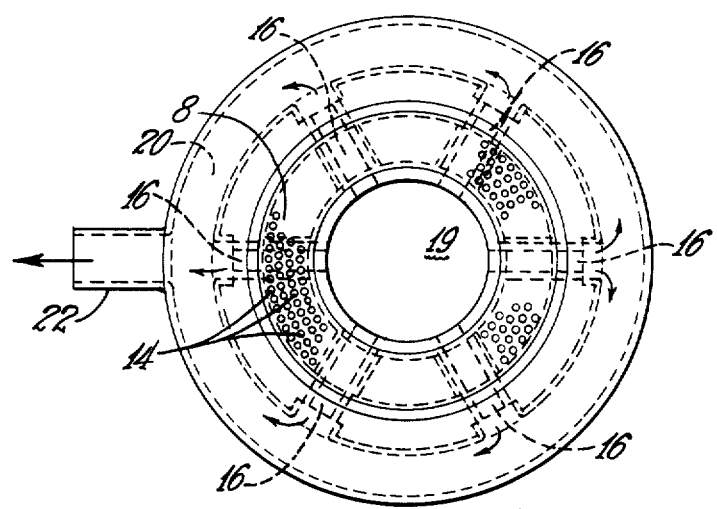
FIG. 5 is a plan view taken through section 5—5 of FIG. 2.

Referring to FIGS. 2 and 5, there is depicted that embodiment showing the bushing comprising an annular orificed ring having a center portion positioned within the ring. The center portion is surrounded by the annular ring having a plurality of ports opening through the ring to provide open communication from the center portion through the annular ring.

In FIGS. 2 and 5, glass 12 enters the upper portion 17 of the bushing from which the glass flows down and around exhaust conduits 16 into the lower portion 18 of the bushing and from which the glass is drawn as fibers through apertures 14 as an annular fan.

Encircling the fan of fibers is gas manifold 9 into which gas, hereinafter referred to as air, is introduced through air inlet 10. The annular fan of fibers is emitted from the bushing plate in such a manner that the air emitted from the manifold through nozzles 21 contacts the fibers and the bushing plate. The air then flows upward into the central portion 19 of the bushing from which it flows through a plurality of exhaust conduits 16 positioned in the glass and into air manifold 20. Any number of nozzles 21 open into exhaust conduits 16 which can be arranged in a spider-like configuration. From exhaust conduits 16, air flows into air manifold 20 from which air exits through one or more conduits 22. Flow in this manner can be induced by vacuum means, not shown, in open communication with conduits 22.

The bushing is held in contact with the forehearth by any suitable fastening means 26 and some portions of the bushing body will advantageously be constructed, or filled, with castable refractory 25. These portions can advantageously be adapted with suitable cooling coil arrangements 24.

Any suitable quantity of air can be supplied through manifold 9 by nozzles 21 and any number of nozzles, sufficient to insure substantially complete contact of the air with the annular bushing orifice plate, can be spaced at suitable intervals around the periphery of the manifold. Nozzles 21 can be individually adjustable in order to control the quantity of air emitted.

Figure 3:
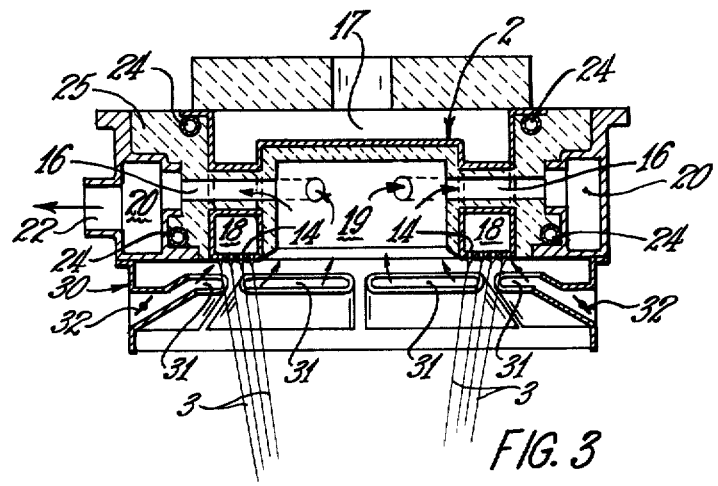
FIG. 3 is a cross sectional view of another embodiment of the invention.

Another embodiment of a suitable air introduction manifold is illustrated in FIG. 3. As shown, manifold 30 can be affixed directly to the bushing body with air inlet slots 31 positioned around the periphery of the manifold which encircles the bushing. These slots can be adapted with dampers or directional vanes 32 to direct the cooling air into contact with the annular bushing orifice plate.

Figure 4:
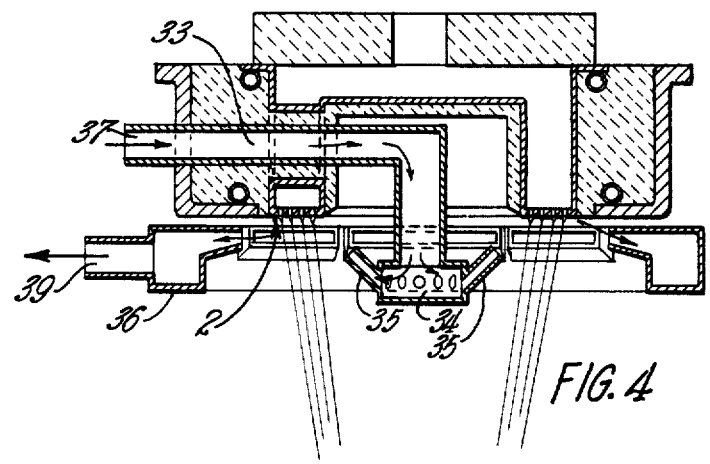
FIG. 4 is a cross sectional view of another embodiment of the invention.

A second embodiment of a suitable air introduction apparatus and manifold is illustrated in FIG. 4. In this embodiment, air is introduced through conduit 37 into sparger 34. The sparger is adapted with a suitable number of air outlet ports 35 which discharge the air within the peripheral confines of the filaments issued in form of a circular veil from apertures 14. Positioned in correspondence with outlet ports 35 are exhaust air manifolds 36 opening into outlet ports 39. By applying a vacuum to the outlet ports 39, a principal portion of the air emitted from outlet ports 35 is caused to flow into contact with the orifice plate and through the fan formed by the filaments, thus acting to cool the bushing plate.

Figure 6:
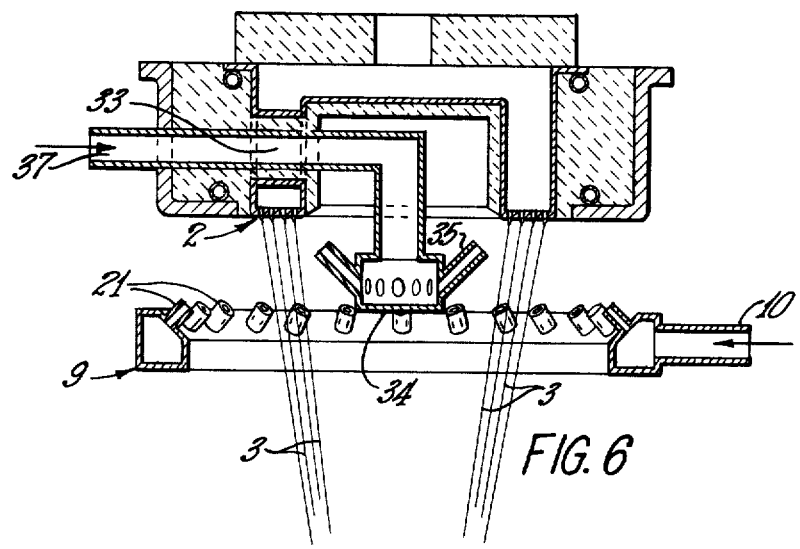
FIG. 6 is an elevational view of another embodiment of the invention.

Referring now to FIG. 6, there is shown, in effect, the combination of that apparatus illustrated in FIGS. 2 and 4, that is, apparatus in which there exists both air introduction manifold 9 peripheral of the annular array of fibers and manifold 34 centrally of the annular array of fibers. In this arrangement, air introduction across the entire width of the apertured bushing plate is accomplished with the downward travel of the fibers acting to carry the introduced air downward from the bushing after contact therewith. In both this embodiment and that depicted in FIG. 4, it is desirable to insulate the air introduction spider in order to insure that no congealment of the glass on the cooler surface of the air introduction spider will take place.

When introduction of air is made centrally and/or exteriorly of the annular array of fibers, the amount of air introduced as either portion can vary to any extent desired.

As discussed in relation to FIGS. 2 and 3, the flow of the air, or gas, introduced into contact with the fibers and for the purpose of cooling the plate will principally be across the annular array of fibers, which, in all instances, can be circular, rectangular or of any other shape, and upward into the central portion of the bushing. However, other modes of flow are possible with this arrangement.

Inherently, some portion of the gas introduced through the array will flow downwardly in adherence with the fibers. This quantity of gas can be altered over a range, depending upon the amount of vacuum drawn to cause the gas to flow upwardly into and out through the central portion of the bushing.

Figure 7:
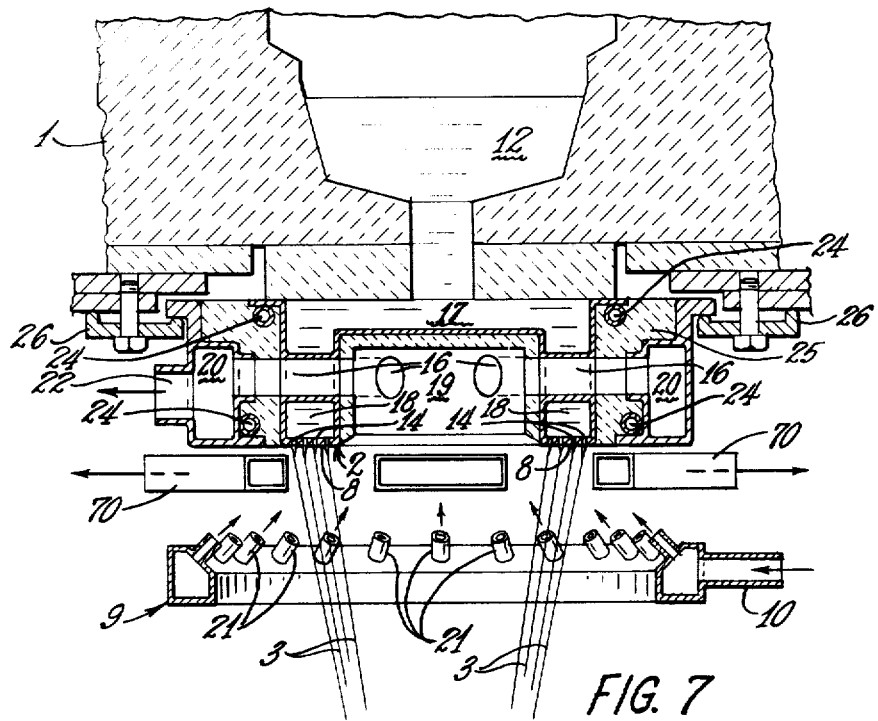
FIG. 7 is an elevational view of another embodiment of the invention.

Still another modification of the exit flow of the gas can be made. As shown in FIG. 7, by drawing a vacuum on ducts 70 which can be located partially or continuously around the array of fibers, some portion of the gas introduced through manifold 9 can be removed sideways across the array. In this instance, too, some portion of the gas introduced through the array will flow downwardly in adherence with the fibers, this quantity being alterable as previously discussed. Furthermore, depending upon the amount of vacuum pulled through ducts 70 and conduits 22, the amounts of gas exiting upwardly through the bushing or outwardly across the array can also be altered over preselected ranges.

As discussed in relation to FIG. 4, the flow of gas is introduced centrally of the array, which as in all instances, can be of any configuration with the gas being drawn through the array by drawing a vacuum on manifold 36.

Inherently, some portion of the gas introduced into the array will flow downwardly in adherence with the fibers. As with the previous embodiment, this quantity of gas can be altered over a range, depending upon the amount of vacuum drawn to cause the gas to flow outwardly across the array.

Figure 8:
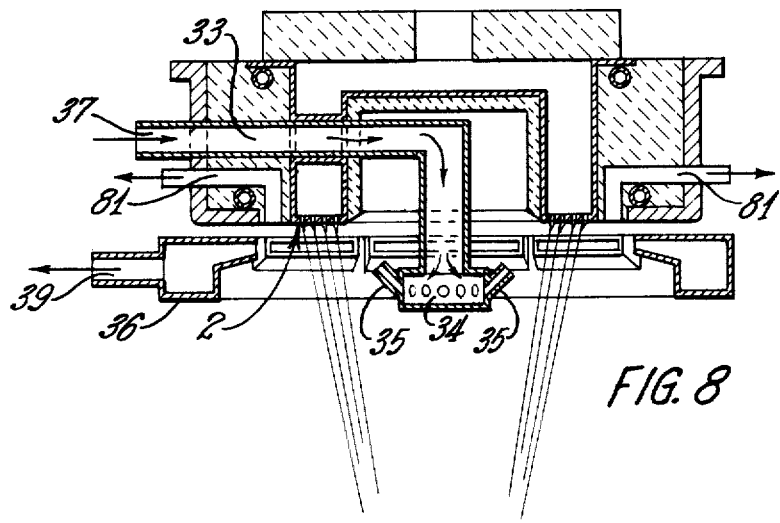
FIG. 8 is an elevational view of another embodiment of the invention.

Still another modification of the exit flow of the gas can be made. As shown in FIG. 8, by drawing a vacuum through ducts 70 which can be positioned partially or continuously around the array of fibers, some portion of the gas introduced through sparger 34 can be removed upwardly through the bushing. In this mode, too, some portion of the gas introduced centrally of the array will flow downwardly in adherence with the fibers, this quantity being alterable depending upon the amount of vacuum being pulled through manifolds 36 and 81. Furthermore, depending upon the amount of vacuum pulled through manifolds 39 and 81, the amounts of gas exiting upwardly through the bushing or outwardly across the array can also be altered over preselected ranges.

Figure 9:
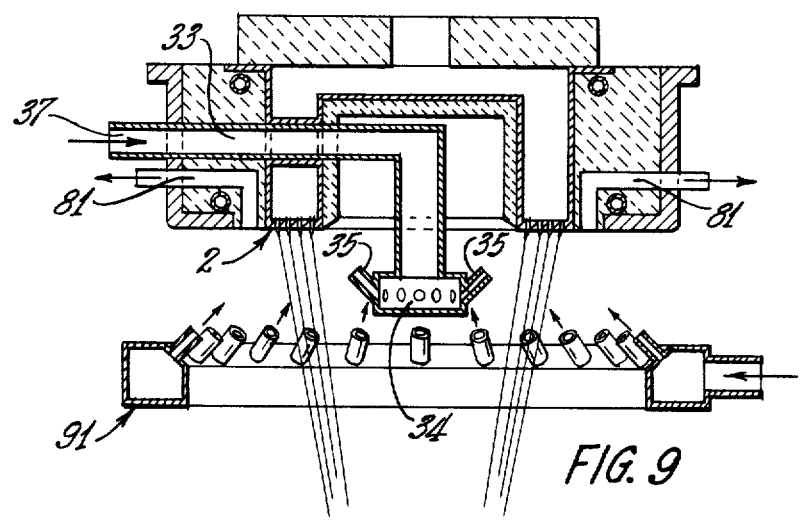
FIG. 9 is an elevational view of another embodiment of the invention.
Figure 10:
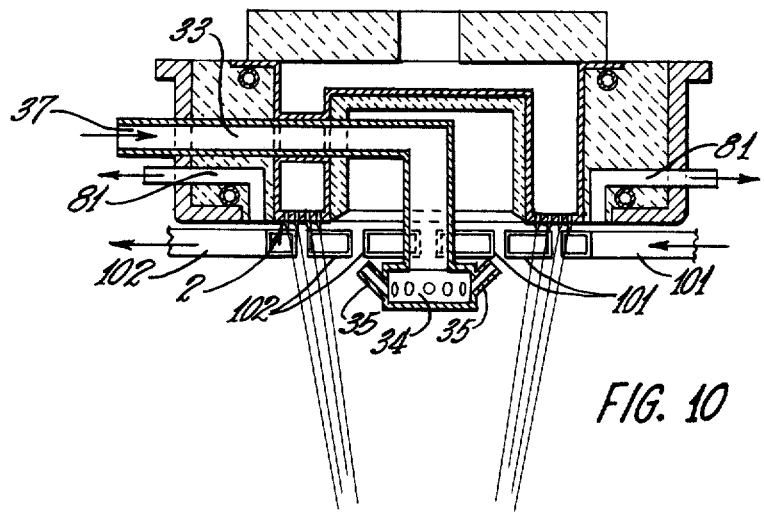
FIG. 10 is an elevational view of another embodiment of the invention.

Two additional embodiments of the invention are shown in FIGS. 9 and 10.

In FIG. 9, the fibers are drawn from bushing 2 in an array. Through gas manifolds 91 and 34, gas is introduced into the array and upwardly, with some portion being carried downward with the fibers.

In FIG. 10, the fibers are drawn from bushing 2 in circular array. Gas is introduced through gas manifolds 101 and 34 with a principal portion being withdrawn through manifold 102 through which a vacuum is drawn. Depending upon the intensity of the vacuum, some portion of the gas will be carried downward with the fibers.

In FIG. 9, manifold 91 can be constructed to encircle any portion, or all, of the array of fibers. Similarly, in FIG. 10, manifolds 101 and 102 can be constructed to encircle any portion, or all, of the array of fibers.

It will be evident from the foregoing that various modifications can be made to this invention. Such, however, are considered within the scope of the invention.

I claim:

1. A glass fiber-forming bushing comprising an annular orificed bushing plate, a center portion positioned within the annular plate and at least one port opening from said center portion into a manifold and at least one port opening from said manifold.

2. The bushing of claim 1 comprising a plurality of ports opening from said center portion.

3. The bushing of claim 2 in which said plurality of ports open into a sparger positioned centrally of said annular plate.

4. The bushing of claim 1 comprising a gas discharge manifold adapted to discharge gas inwardly towards said center portion of said plate and into contact with glass strands drawn from said bushing.

5. The bushing of claim 4 comprising a second manifold positioned circumferentially of the orificed area of said bushing plate adapted to receive gas discharged from said gas discharge manifold.

6. A glass fiber-forming bushing comprising an annular orificed bushing plate, a center portion positioned within the annular plate, at least one port opening from said center portion to the exterior of said bushing, a first manifold positioned in spaced relationship to said bushing and adapted to discharge gas into contact with said bushing plate and a second manifold positioned intermediate said bushing plate and said first manifold and adapted to withdraw gas along said bushing plate.

7. A method of producing glass fibers which comprises drawing glass fibers as an annular array from an annular bushing having a center portion positioned within an annular portion of said bushing, introducing a gas into contact with the outer periphery of said annular array, and drawing said gas through said array and through a center portion of said bushing.

8. The method of claim 7 in which said gas is introduced into contact with the inner periphery of said annular array.

9. The method of claim 7 in which said gas is introduced into contact with the inner periphery of said annular array and gas is withdrawn from said center portion of said bushing.

10. A method of producing glass fibers which comprises drawing glass fibers as an annular array from an annular bushing having a center portion positioned within an annular portion of said bushing, introducing a gas into contact with the inner periphery of said array and withdrawing said gas through a center portion of said bushing.

11. A method of producing glass fibers which comprises drawing glass fibers as an annular array from an annular bushing having a center portion positioned with an annular portion of said bushing, introducing a gas into contact with the outer periphery of said array and into the annular portion of said bushing and withdrawing a first portion of the gas through the center portion of said bushing and withdrawing a second portion of the gas from within said annular array from a locus between the point of introduction of said gas and the face of said bushing.

12. The method of claim 7 in which said gas is withdrawn from said center portion of said bushing.

* * * * *